(12) United States Patent
Mahler (10) Patent No.: US 12,009,896 B2
(45) Date of Patent: Jun. 11, 2024

(54) SYSTEM AND METHOD FOR IMPROVING CONNECTION STABILITY VIA DECEPTIVE SIGNAL QUALITY TRANSMISSIONS

(71) Applicant: The Joan and Irwin Jacobs Technion-Cornell Institute, New York, NY (US)

(72) Inventor: Kim Mahler, New York, NY (US)

(73) Assignee: THE JOAN AND IRWIN JACOBS TECHNION-CORNELL INSTITUTE, New York, NY (US)

( * ) Notice: Subject to any disclaimer, the term of this patent is extended or adjusted under 35 U.S.C. 154(b) by 0 days.

(21) Appl. No.: 18/175,722

(22) Filed: Feb. 28, 2023

(65) Prior Publication Data

US 2023/0318678 A1 Oct. 5, 2023

Related U.S. Application Data

(60) Provisional application No. 63/362,096, filed on Mar. 29, 2022.

(51) Int. Cl.
*H04B 7/06* (2006.01)
*H04W 40/12* (2009.01)
*H04W 72/543* (2023.01)

(52) U.S. Cl.
CPC .......... *H04B 7/0639* (2013.01); *H04W 40/12* (2013.01); *H04W 72/543* (2023.01)

(58) Field of Classification Search
CPC ... H04B 7/0613; H04B 7/0639; H04W 40/02; H04W 40/12; H04W 72/542; H04W 72/543; H04W 88/00

(Continued)

(56) References Cited

U.S. PATENT DOCUMENTS 7,274,920 B2 9/2007 Jin
7,860,513 B2 12/2010 Chung et al.
(Continued)

FOREIGN PATENT DOCUMENTS

CN 101180804 B 6/2011
CN 101764682 B 1/2013
(Continued)

OTHER PUBLICATIONS

Alexiou, Antonios, et al. "Efficient MCS selection for MBSFN transmissions over LTE networks." 2010 IFIP Wireless Days. IEEE, 2010.

(Continued)

*Primary Examiner* — Young T. Tse
(74) *Attorney, Agent, or Firm* — M&B IP Analysts, LLC (57) ABSTRACT

Techniques for optimizing connection stability via communications with base stations in wireless communication networks. A current actual signal-to-distortion measurement value is determined for signals received by a device from a base station in a wireless communication network. A target base station configuration is determined based on the actual signal-to-distortion measurement value and known relationships between signal-to-distortion measurements and reliability metrics corresponding to different base station configurations. Deceptive signal quality transmissions are sent to the base station until the base station selects the target base station configuration. The deceptive signal quality transmissions may include deceptive signal-to-distortion measurements or deceptive binary values indicating poor signal quality. In various embodiments, the target base station configuration is determined based further on a required data rate such that signals transmitted using the target base station configuration meet the required data rate.

19 Claims, 5 Drawing Sheets

(58) Field of Classification Search
USPC ........ 375/259, 260, 262, 265, 267; 370/328, 370/332, 333; 455/426.2, 456.5, 513, 455/524, 525, 67.11, 67.13
See application file for complete search history.

(56) References Cited

U.S. PATENT DOCUMENTS

| | | | |
|---|---|---|---|
| 7,983,687 | B2 | 7/2011 | Englund et al. |
| 8,155,661 | B2 | 4/2012 | Gerlach |
| 8,423,014 | B2 | 4/2013 | McGregor et al. |
| 8,667,356 | B2 | 3/2014 | Wang et al. |
| 9,094,951 | B2 | 7/2015 | Li et al. |
| 9,357,464 | B2 | 5/2016 | Olofsson et al. |
| 9,474,000 | B2 | 10/2016 | Kilpatrick et al. |
| 9,591,543 | B2 | 3/2017 | Reial et al. |
| 9,629,050 | B2 | 4/2017 | Siomina et al. |
| 9,692,498 | B2 | 6/2017 | Fan et al. |
| 9,775,063 | B2 | 9/2017 | Siomina et al. |
| 9,940,842 | B2 | 4/2018 | Shaw et al. |
| 10,979,977 | B2 | 4/2021 | Young et al. |
| 11,089,509 | B2 | 8/2021 | Fischer |
| 2010/0112952 | A1* | 5/2010 | Molnar .................. H01Q 1/246 455/63.1 |
| 2011/0228712 | A1 | 9/2011 | Anderson |
| 2013/0028307 | A1 | 1/2013 | Ren et al. |
| 2017/0086135 | A1* | 3/2017 | Matsuo ................. H04W 36/08 |
| 2017/0366981 | A1* | 12/2017 | Takano ................ H04B 7/0469 |
| 2020/0204277 | A1 | 6/2020 | Zhou |
| 2020/0383119 | A1 | 12/2020 | Sun et al. |
| 2022/0038934 | A1* | 2/2022 | Kumar .................. H04W 24/10 |
| 2022/0077913 | A1* | 3/2022 | Horn ..................... H04B 7/088 |
| 2022/0360947 | A1* | 11/2022 | Zhu ................... H04W 36/0007 |

FOREIGN PATENT DOCUMENTS

| | | |
|---|---|---|
| EP | 2826177 B1 | 6/2021 |
| KR | 100921511 B1 | 10/2009 |
| WO | 2009132576 A1 | 11/2009 |
| WO | 2014000236 A1 | 1/2014 |
| WO | 2014119940 A1 | 8/2014 |
| WO | 2019151819 A1 | 8/2019 |

OTHER PUBLICATIONS

Bitsikas, Evangelos, and Christina Popper. "Don't hand it over: Vulnerabilities in the handover procedure of cellular telecommunications." Annual Computer Security Applications Conference. 2021.
International Search Report PCT/IB2023/051864. Feb. 28, 2023.
Written Opinion of the International Searching Authority PCT/IB2023/051864, Feb. 28, 2023.

* cited by examiner

SYSTEM AND METHOD FOR IMPROVING CONNECTION STABILITY VIA DECEPTIVE SIGNAL QUALITY TRANSMISSIONS

CROSS-REFERENCE TO RELATED APPLICATIONS

This application claims the benefit of U.S. Provisional Application No. 63/362,096 filed on Mar. 29, 2022, the contents of which are hereby incorporated by reference.

TECHNICAL FIELD

The present disclosure relates generally to vehicles moving in a wireless communication network such as drones navigating within a cellular network, and more particularly to maintaining and improving connection stability for connections between such vehicles and base stations of the wireless communication network.

BACKGROUND

As use of unmanned vehicles and vehicle navigation support systems continues to increase, so too does the need for improving automated or semi-automated navigation of vehicles. In particular, unmanned aerial vehicles, commonly referred to as drones, lack a human pilot and therefore often rely on communications with remote operators in order to navigate. As a result, drones and other unmanned vehicles must connect to networks and maintain those network connections. If a connection is lost when important navigation instructions would be received, then the drone may fail to navigate properly, which could result in harm to the drone, its surroundings, or nearby people. Thus, connection stability is safety-critical for such implementations.

In many applications of drones, the drones are equipped with network interfaces in order to allow them to communicate with a cellular network. A cellular network is a communication network in which the link to and from each end node is wireless. The cellular network is distributed over land areas referred to as cells, with one or more transceivers deployed in each cell. The transceivers in each cell provide network coverage to the cell, which in turn allows for transmitting data to and from systems within the cell. The cells collectively provide network coverage over a broader geographic area. Using cellular networks with multiple transceivers in respective cells may offer several advantages over a single large transmitter such as requiring less power by vehicles communicating with the transceivers and providing a larger area of coverage than a single transceiver.

Each transceiver in a network may be deployed with a respective base station such as, for example, a cell tower. The base station typically includes computing components configured to determine appropriate configurations for transmissions to devices operating in the network. For example, the base station may utilize a particular modulation scheme and/or encoding rate for transmissions to a particular device. The computing components are generally configured to select configurations that achieve particular levels of reliability for different circumstances (e.g., a required level of reliability for sending video feed). The configuration used to realize such a level of reliability may be, for example, a higher throughput or data rate. Distortions such as noise and interference may affect the signal quality of signals received by a device. These distortions and, more specifically, their effects on signal quality, can necessitate adjusting parameters related to transmission of signals in order to maintain a certain reliability level, typically at a lower spectral efficiency and therefore at a lower data rate or throughput.

Many providers of such networks utilize a mapping between signal to noise ratio (SNR) or signal to interference & noise ratio (SINR) and throughput at a desired reliability level in order to determine the appropriate configuration depending on need. For example, a base station may improve throughput when SINR is high by beginning to transmit signals with a higher modulation and coding scheme (MCS). To this end, devices in the network may transmit signal-to-distortion data such as SNR or SINR to base stations in order to allow the base stations to make decisions about transmissions to those devices.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for optimizing connection stability via communications with base stations in wireless communication networks. The method comprises: determining a signal-to-distortion measurement value for signals received by a device from a base station in a wireless communication network; determining a target base station configuration based on the determined signal-to-distortion measurement value and a plurality of predetermined relationships between signal-to-distortion measurement values and reliability metrics corresponding to different base station configurations; and sending at least one signal quality transmission to the base station based on the determined target base station configuration, wherein each of the at least one signal quality transmission includes a signal quality indicator that differs from a signal quality corresponding to the determined signal-to-distortion measurement value.

Certain embodiments disclosed herein also include a non-transitory computer readable medium having stored thereon causing a processing circuitry to execute a process, the process comprising: determining a signal-to-distortion measurement value for signals received by a device from a base station in a wireless communication network; determining a target base station configuration based on the determined signal-to-distortion measurement value and a plurality of predetermined relationships between signal-to-distortion measurement values and reliability metrics corresponding to different base station configurations; and sending at least one signal quality transmission to the base station based on the determined target base station configuration, wherein each of the at least one signal quality transmission includes a signal quality indicator that differs from a signal quality corresponding to the determined signal-to-distortion measurement value.

Certain embodiments disclosed herein also include a system for optimizing connection stability via communications with base stations in wireless communication networks. The system comprises: a processing circuitry; and a memory, the memory containing instructions that, when executed by the processing circuitry, configure the system to: determine a signal-to-distortion measurement value for signals received by a device from a base station in a wireless communication network; determine a target base station configuration based on the determined signal-to-distortion measurement value and a plurality of predetermined relationships between signal-to-distortion measurement values and reliability metrics corresponding to different base station configurations; and send at least one signal quality transmission to the base station based on the determined target base station configuration, wherein each of the at least one signal quality transmission includes a signal quality indicator that differs from a signal quality corresponding to the determined signal-to-distortion measurement value.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Recognizing that base stations may select appropriate transmission parameters and base station configurations depend on the relative degree of signal-to-distortion for devices operating in a wireless communication network, it has been identified that the reliability of transmissions received by a device operating in the wireless communication network can be manipulated using signal-to-distortion data transmitted to base stations via such a device. It has further been identified that certain kinds of devices, such as devices of vehicles navigating in the network, require higher stability than other devices in order to ensure that navigation is not interrupted since such interruptions could result in the vehicle crashing or otherwise causing damage to people or objects in the geographic location encompassed by the network.

To this end, various disclosed embodiments provide techniques for improving or otherwise maintaining connection stability for devices navigating in a wireless communication network that include manipulating data transmitted to base stations in order to prompt the base stations to alter their configurations with respect to signal transmissions. The disclosed embodiments utilize known relationships between signal-to-distortion measurements and reliability metrics for respective modulation and coding schemes (MCSs) in order to achieve a desired signal reliability.

More specifically, the disclosed embodiments include transmitting deceptive signal-to-distortion values that are different from actual signal-to-distortion values for signals received by a device in order to deceive base stations into selecting different modulation and encoding schemes than would be selected based on the actual signal-to-distortion values. The deceptive signal-to-distortion values may be determined using known relationships between signal-to-distortion measurements and reliability metrics such that, when used by the base station to select a modulation and coding scheme, the base station selects a modulation and coding scheme that will achieve a target reliability metric (e.g., as measured with respect to block error rate).

In this regard, it is noted that many base stations select the modulation and coding scheme to be utilized for transmissions to a device based on signal-to-distortion values such as signal-to-noise ratio transmitted as pilot signals by the device. Base stations do not typically accept requests for a particular modulation and coding scheme or otherwise allow the device to select the reliability of signals it will receive. Accordingly, the disclosed embodiments provide techniques that manipulate the base station into selecting different configurations (e.g., different modulation and coding schemes) by transmitting deceptive data that may not reflect reality.

It has also been identified that providing deceptive signals in order to boost signal reliability may cause unintended side effects which may have caused sending such deceptive transmissions to be undesirable for at least some applications. In particular, a base station may alter its modulation scheme and increase its encoding rate in a manner that improves reliability. However, such changes may also result in reducing spectral efficiency without increasing frequency. As a result, the data rate (e.g., the bitrate) at which data can be transmitted could become limited. In some implementations, this could result in the base station being unable to transmit certain types of signals which may be needed for a given application. As a non-limiting example, video data typically requires a much higher bitrate to transmit than other types of data, and signals having a spectral efficiency below a threshold may be unable to carry video data.

To this end, various disclosed embodiments determine the deceptive data to be transmitted to the base station based further on data rates, for example, by transmitting deceptive data in order to achieve a particular spectral efficiency or to otherwise ensure that the resulting spectral efficiency of the base station meets a threshold. These embodiments allow for balancing maximizing reliability with ensuring sufficient data rate for a given application (e.g., depending on the type of data to be transmitted). More specifically, a mapping further including spectral frequencies corresponding to different base station or antenna configurations may be utilized in combination with a predetermined bitrate associated with the type of data to be transmitted between the device and the base station in order to determine a configuration that maximizes reliability while ensuring that the minimum data rate requirements are met.

The various disclosed embodiments can be realized using very simple communications that minimize the amount of data needed to be transmitted in order to cause base stations to optimize connection stability. Specifically, in certain embodiments, the transmissions by the device may be or may include basic binary communications about signals and distortions (e.g., a binary communication that represents whether the ratio of signal-to-distortion is either good or poor). These binary communications may be determined such that the signal quality indicated by the determined binary value (e.g., a value of zero corresponding to poor signal quality) differs from an actual signal quality corresponding to the signal-to-distortion measurements for the device (e.g., a value of one corresponding to good signal quality). The actual signal-to-distortion measurements may be continually or repeatedly measured, and additional binary communications may be sent to the base station until the actual signal-to-distortion ratio reaches a desired threshold. As a result, the use of bandwidth by devices utilizing the disclosed techniques can be minimized.

Figure 1:
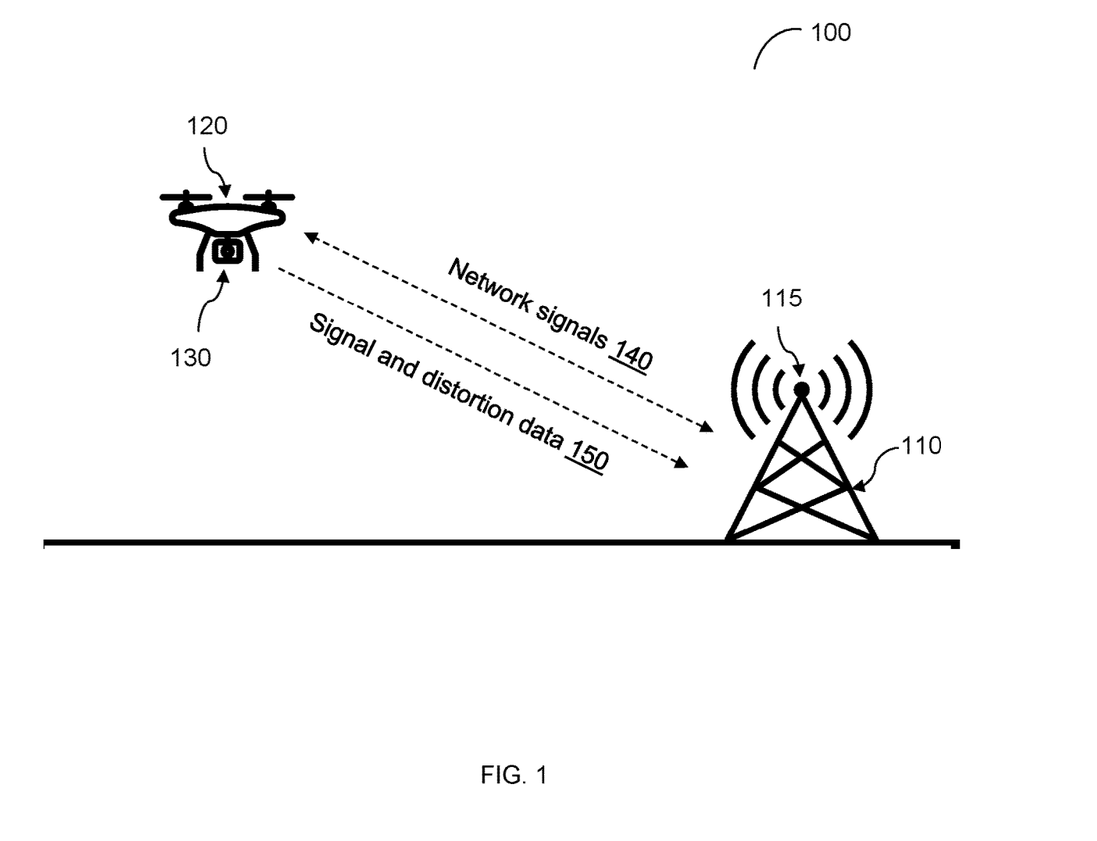
FIG. 1 is a communications diagram illustrating communications between a vehicle including a device and a base station utilized to describe various disclosed embodiments.

FIG. 1 shows an example communications diagram 100 illustrating communications between a vehicle and a base station utilized to describe various disclosed embodiments.

As shown in the communications diagram 100, a base station 110 communicates with a device such as, but not limited to, a navigation unit 130 installed on a vehicle 120. The base station 110 is deployed in a wireless communication network (not depicted) such as, but not limited to, a cellular network. In an example implementation, the base station 110 is a cell tower. The base station includes one or more antennae 115 configured to transmit signals to the navigation unit 130.

The vehicle 120 may be, but is not limited to, an unmanned aerial vehicle (UAV), commonly referred to as a drone, or any other vehicle which may require signals from the base station 110 such as for navigation. During operation, the navigation unit 130 receives signals transmitted by the base station 110 carrying data such as, but not limited to, navigation instructions. For example, network signals 140 may be communicated between the navigation unit 130 and the base station 110. The network signals 140 may further include data about the base station 110 such as, but not limited to, a bandwidth utilized by the base station 110. An example schematic diagram of the hardware components of the navigation unit 130 is described further below with respect to FIG. 5.

In various implementations, the navigation unit 130 is configured to transmit data indicative of signal quality such as signal and distortion data 150 to the base station 110 in order to provide the base station 110 with information to be utilized in determining the modulation and encoding scheme to be utilized. Such signal quality data may include one or more signal-to-distortion measurements such as, but not limited to, signal-to-noise ratio (SNR), signal-to-interference ratio (SIR), signal-to-interference-and-noise ratio (SINR), and the like. Alternatively or collectively, the signal quality data may include binary values indicating whether signal quality is either poor (e.g., 0) or fair (e.g., 1).

The base station 110 is configured to select a configuration based on the signal quality data received from the navigation unit 130. As a non-limiting example, the base station 110 may select the modulation scheme and/or encoding rate (the modulation scheme and encoding rate may be collectively referred to as a modulation and coding scheme, or MCS) used for transmitting signals by the antenna 115 in order to match a modulation scheme and coding rate associated with a SNR value provided by the device. To this end, the base station 110 may have stored thereon a mapping between signal-to-distortion measurements and configuration parameters.

A non-limiting example of such a mapping is described further below with respect to FIG. 3, which depicts an example mapping 300 which may be utilized by a base station. The example mapping diagram 300 illustrates various indices 310, each of which corresponds to a respective combination of parameters in columns signal-to-distortion ratio 320, spectral efficiency 330, modulation scheme 340, and coding rate 350. In the example implementation shown in FIG. 3, each of the signal-to-distortion ratios in the column 320 is a signal-to-noise ratio (SNR) in decibels (dB), and each of the spectral efficiencies is a value measured in bits per second (bps) per Hertz (Hz).

Figure 3:
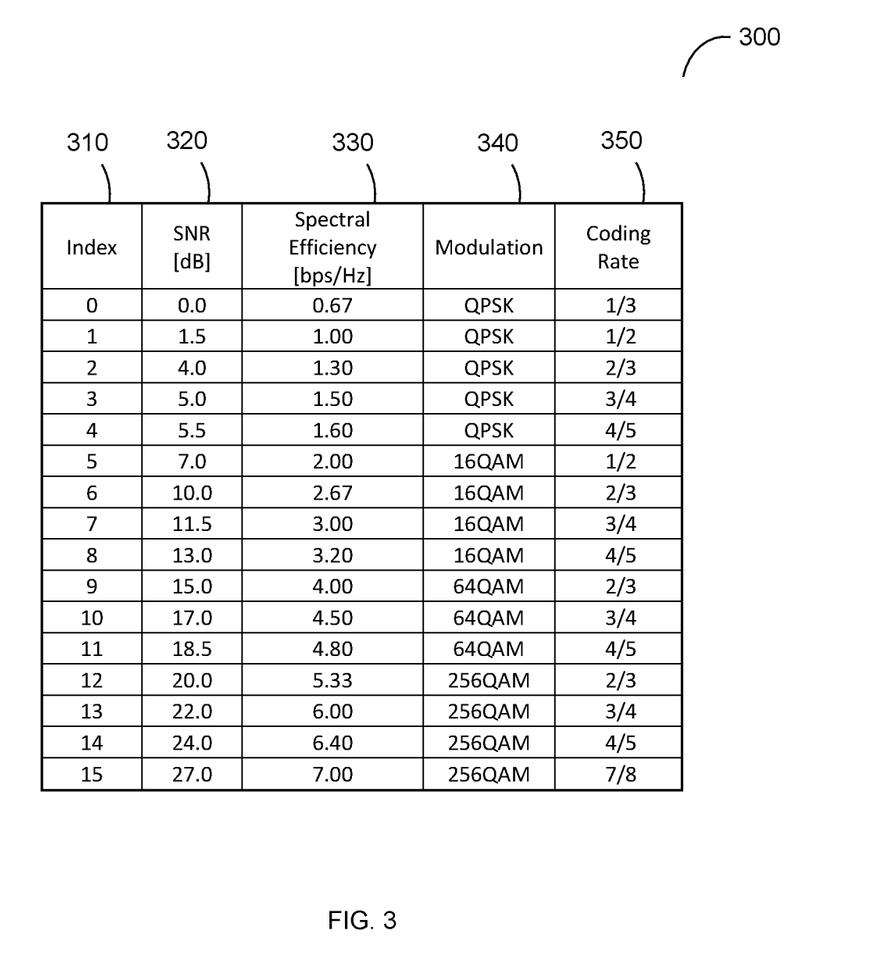
FIG. 3 is a mapping diagram showing an example mapping between signal to interference noise ratios and modulation and coding schemes.

In the example implementation shown in FIG. 3, example modulation schemes include Quadrature Phase Shift Keying (QPSK), 16-state quadrature amplitude modulation (16QAM), 64-state quadrature amplitude modulation (64QAM), and 256-state quadrature amplitude modulation (256QAM). It should be noted that other modulation schemes may be equally utilized without departing from the scope of the disclosure.

The mapping depicted in FIG. 3 may be a mapping used by a particular base station (e.g., the base station 110, FIG. 1), by base stations deployed in the same wireless communication network, by base stations operated by the same entity, and the like.

When a base station configured with the mapping 300 receives, from a device, a SNR value of 5.0, the base station identifies the SNR value as corresponding to index 3 and sets its modulation and coding scheme (MCS) to have a modulation scheme of QPSK and a coding rate of 3/4.

Each index as shown in FIG. 3 corresponds to a respective modulation scheme and encoding rate, and may further correspond to a respective channel quality indicator (not shown). Such a channel quality indicator (CQI) may be an index representing a general assessment of channel quality. As discussed further below with respect to FIG. 4, for a base station operating at a given bandwidth, each CQI (and, consequently, the respective MCS) demonstrates a known relationship between signal-to-distortion measurements and reliability metrics. To this end, it has been identified that a MCS for which the reliability metric will meet or exceed a threshold for a given actual SNR value can be determined using these known relationships and utilized by a device in order to determine deceptive signal quality transmissions that will cause the base station to select a MCS that will achieve the target reliability.

Further, using a mapping that also includes values related to data rate such as spectral efficiencies as depicted in FIG. 3 allows for selecting signal-to-distortion ratio for which transmissions by the base station will still ensure a threshold data rate while also meeting a target reliability metric. This, in turn, allows for optimizing connection stability of a device while ensuring that necessary types of data can still be transmitted to the device. As a non-limiting example using the mapping of FIG. 3, when data transmitted between the base station and the device includes data requiring at least a spectral efficiency of 2.5 bps/Hz, the deceptive SNR value may be determined as a value greater than or equal to 10.0 dB (i.e., the lowest SNR value for which the spectral efficiency is over 2.50 bps/Hz) even if a lower SNR value would achieve the target reliability metric.

Returning to FIG. 1, in accordance with various disclosed embodiments, the navigation unit 130 is configured to send deceptive transmissions related to signal quality to the base station 110 in order to optimize connection stability as described herein. More specifically, the navigation unit 130 is configured to send transmissions indicating that signal quality is poor or otherwise to send signal-to-distortion measurement values that are falsely below the actual current values of signals received from the base station 110 by the navigation unit 130, thereby prompting the base station 110 to adjust its configuration accordingly.

Figure 2:
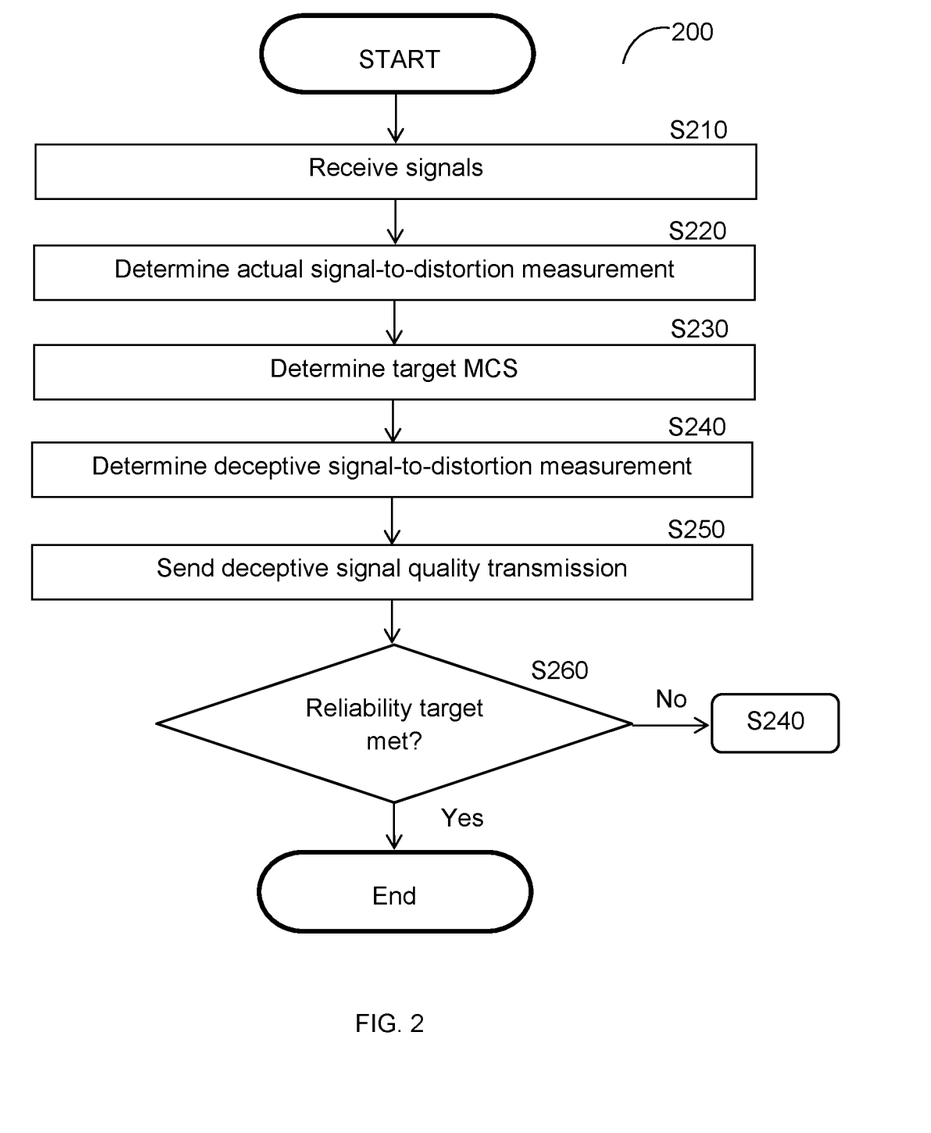
FIG. 2 is a flowchart illustrating a method for improving connection stability via communications with base stations in a wireless communication network according to an embodiment.
Figure 4:
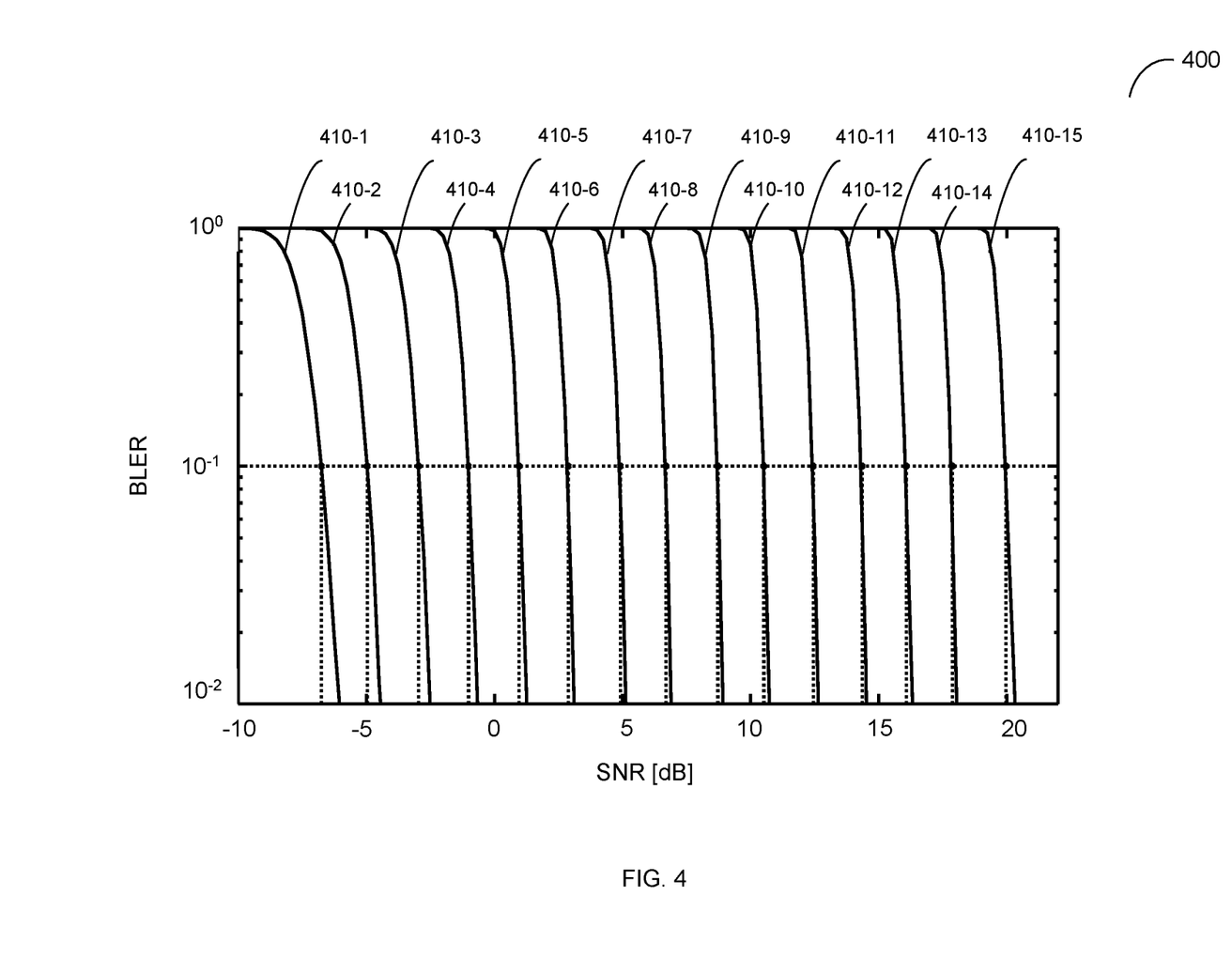
FIG. 4 is an illustration of various example signal-to-distortion measurement and signal quality curves for respective modulation and coding schemes.

To this end, in an embodiment, the navigation unit 130 is configured to utilize this mapping in order to determine deceptive signal quality transmissions based on known relationships between signal-to-distortion measurements and reliability metrics with respect to different base station configurations, and to send those deceptive transmissions to a base station, for example as described herein with respect to FIG. 2. An example graph illustrating such known relationships between signal-to-distortion measurements and reliability metrics with respect to different base station configurations is illustrated in FIG. 4, described in further detail herein below.

FIG. 2 is a flowchart 200 illustrating a method for improving connection stability via communications with base stations in a wireless communication network according to an embodiment. In an embodiment, the method is performed by a device such as the navigation unit 130, FIG. 1.

At S210, signals communicated between the device and an antenna (e.g., the antenna 115 of the base station 110, FIG. 1) are received. In particular, one or more signals transmitted by the antenna are received by the device. The obtained signals may be, for example but not limited to, pilot signals sent during initial communications with the base station.

At S220, a value indicating the current actual signal quality relative to signal-distorting effects is determined based on the signals received at S210. The signal quality may be determined as, for example but not limited to, a signal-to-distortion measurement of the signal power as compared to a power of one or more signal-distorting effects such as noise or interference. Such a signal-to-distortion measurement may be, but is not limited to, a signal-to-noise ratio (SNR), a signal-to-interference ratio (SIR), a signal-to-interference-plus-noise ratio (SINR), and the like.

At S230, based on the actual signal-to-distortion measurement, a target modulation and coding scheme (MCS) that will achieve a target reliability for the device is determined. In an embodiment, the MCS is determined based on known relationships between signal-to-distortion measurements and reliability metrics. These known relationships may vary depending upon the bandwidth being used for communications. To this end, in an embodiment, a set of known relationships corresponding to a bandwidth used by the base station are used to determine the actual reliability metric.

FIG. 4 depicts a graphical illustration 400 demonstrating known relationships between signal-to-distortion measurements in the form of signal-to-noise ratio (SNR) values and reliability metrics in the form of block error rates (BLERs) for a particular bandwidth. As depicted in FIG. 4, curves 410-1 through 410-15 demonstrate the relationship between SNR and BLER for respective channel quality indicators (not depicted). Each channel quality indicator corresponds to a respective MCS such as, but not limited to, one of the combinations of modulation scheme and coding rate depicted in FIG. 3. A base station is typically configured to select a MCS that will achieve a certain level of reliability (e.g., a BLER of $10^{-1}$), where the level of reliability that the base station is configured to achieve may be different from the target reliability for the device.

As a non-limiting example for determining an actual reliability measurement using known relationships such as those depicted in FIG. 4, when the actual SNR value for the device is determined to be 5 dB and the base station is configured to achieve a reliability of at most $10^{-1}$ BLER, it is determined that the channel quality indicator (CQI) 410-7 demonstrates the relationship between SNR and BLER encompassing a SNR value of 5 dB and a BLER of $10^{-1}$. As shown in FIG. 4, for the CQI 410-7 at a SNR value of 5 dB, the corresponding BLER value on the curve is around $10^{-1}$.

In this example, when a target reliability metric for the device is a BLER value of $10^{-2}$, it is determined that the reliability metric of $10^{-1}$ for the actual SNR of CQI 410-7 does not meet the target but that, for the same SNR of 5 dB, any of the CQIs 410-1 through 410-6 would yield a BLER value less than or equal to $10^{-2}$. To this end, a MCS corresponding to one of the CQIs 410-1 through 410-6 is determined as the target MCS.

Returning to FIG. 2, at S240, a deceptive signal quality indicator is determined. The deceptive signal quality indicator may be or may include, but is not limited to, a deceptive signal-to-distortion measurement, a deceptive binary value, or any other indicator of signal quality which differs from the actual signal quality indicator that would be determined based on the actual signal-to-distortion measurements for the device. In other words, the deceptive signal quality indicator is deceptive in the sense that it differs from the actual signal quality experienced by the device. A deceptive signal-to-distortion measurement is determined based on the known relationships between signal-to-distortion measurements and reliability for different CQIs such that the base station selects the target MCS for its configuration.

In the above example discussed with respect to FIG. 4, if the MCS associated with the CQI 410-6 is determined as the target MCS, a SNR value of 3 dB is determined as the deceptive signal-to-distortion. In other words, the SNR value of 3 dB corresponds to the BLER value of $10^{-1}$ for the CQI 410-6, so the SNR value of 3 dB is selected as the deceptive signal-to-distortion measurement.

In an embodiment, the deceptive signal quality indicator is determined based further on a required data rate for the device and a known mapping between MCSs and data rates. As a non-limiting example, as depicted in FIG. 3, the column spectral efficiency 330 includes spectral efficiency values corresponding to respective combinations of modulation schemes and coding rates (i.e., to respective MCSs). The deceptive signal-to-distortion measurement may be determined such that the MCS selected by the base station based on this deceptive signal-to-distortion measurement will be a MCS which will both achieve a target reliability metric for the actual signal-to-distortion measurement and which will meet or exceed a threshold value for spectral efficiency, thereby ensuring that the required data rate is achieved by a base station using the target MCS.

At S250, a deceptive signal quality transmission is sent to the base station. In an embodiment, the deceptive transmission includes the deceptive signal-to-distortion measurement. As noted above, upon receiving a signal-to-distortion measurement from a device, the base station is configured to select a MCS corresponding to the signal-to-distortion measurement, for example as described above with respect to FIG. 3. Accordingly, by transmitting the deceptive signal-to-distortion measurement, the device can effectively select the MCS to be used by the base station.

In another embodiment, the deceptive transmission includes a binary value. As a non-limiting example, the deceptive transmission includes a binary value of 0 representing poor signal quality (e.g., as opposed to a binary value of 1 representing fair signal quality). In a further embodiment, the deceptive transmission may only include the binary value, thereby reducing the amount of data needed to be transmitted by the device as compared to sending more complicated values or otherwise sending larger amounts of data. This binary value may be sent iteratively.

In an embodiment, the actual signal-to-distortion measurement may be iteratively determined, and deceptive binary transmissions indicating poor signal quality may be sent at each iteration until the point at the actual signal-to-distortion measurement and the reliability metric to be achieved by the base station lies along the curve for the CQI corresponding to the target MCS. As a non-limiting example described with respect to FIG. 4, when the target MCS corresponds to the CQI 410-3, the base station selects a MCS for a SNR to achieve a reliability metric of a BLER value of around $10^{-1}$, and the actual SNR is initially determined to be 5 dB, a first deceptive transmission indicating poor signal quality may be sent at the first iteration. Subsequent deceptive transmissions indicating poor signal quality are sent to the base station at each iteration until the actual SNR for a given iteration is below −3 dB (i.e., the SNR value for BLER of $10^{-1}$ and the CQI 410-3). This ultimately results in the base station selecting the target MCS.

At S260, it is determined whether the actual reliability meets a target reliability metric and, if so, execution terminates; otherwise, execution continues with S240. The target may be, but is not limited to, a predetermined reliability threshold value. As a non-limiting example, the reliability target may be a maximum acceptable value for BLER such that actual BLER values higher than the target are determined as failing to meet the target and actual BLER values less than or equal to the target are determined to meet the target.

To this end, in an embodiment, S260 includes receiving signals from the base station and determining, based on the received signals, an actual reliability metric for the signals from the base station. The actual reliability metric may be compared to the target reliability metric in order to determine whether the actual reliability meets the target reliability metric.

Figure 5:
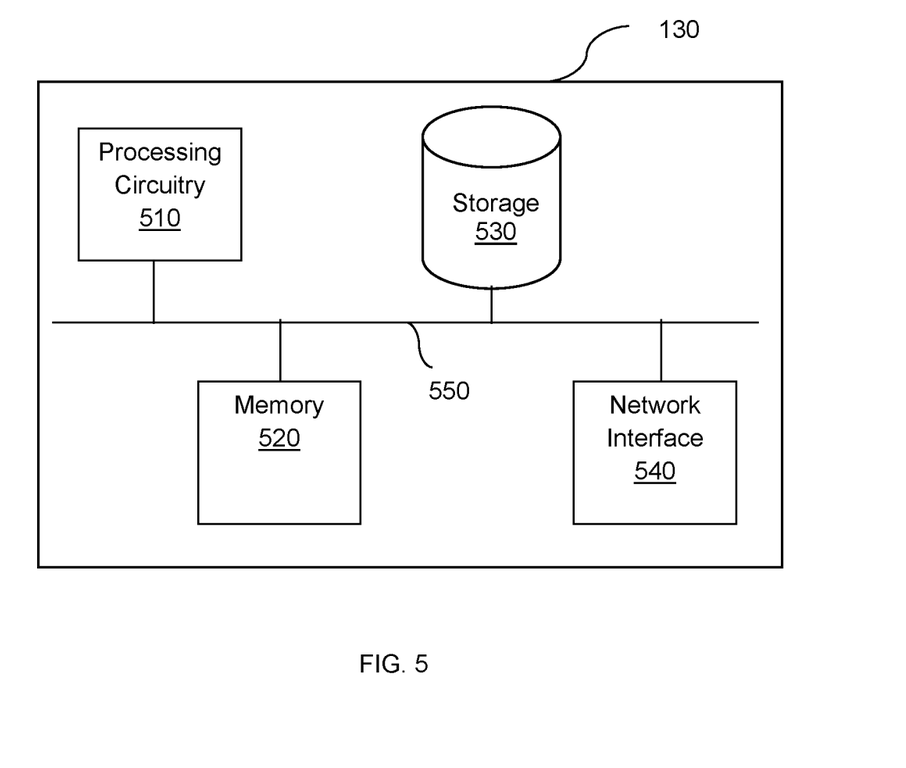
FIG. 5 is a schematic diagram of a navigation unit according to an embodiment.

FIG. 5 is an example schematic diagram of a navigation unit 130 according to an embodiment. The navigation unit 130 includes a processing circuitry 510 coupled to a memory 520, a storage 530, and a network interface 540. In an embodiment, the components of the navigation unit 130 may be communicatively connected via a bus 550. The navigation unit 130 may be installed on, included in, or otherwise deployed in relation to a vehicle (e.g., the vehicle 120, FIG. 1) such as a drone that moves through a wireless communication network such as a cellular network.

The processing circuitry 510 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 520 may be volatile (e.g., random access memory, etc.), non-volatile (e.g., read only memory, flash memory, etc.), or a combination thereof.

In one configuration, software for implementing one or more embodiments disclosed herein may be stored in the storage 530. In another configuration, the memory 520 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 510, cause the processing circuitry 510 to perform the various processes described herein.

The storage 530 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 540 allows the navigation unit 130 to communicate with at least the base station 110.

It should be understood that the embodiments described herein are not limited to the specific architecture illustrated in FIG. 5, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for optimizing connection stability via communications with base stations in wireless communication networks, the method comprising:
    determining a signal-to-distortion measurement value for signals received by a device from a base station in a wireless communication network;
    determining a target base station configuration based on the determined signal-to-distortion measurement value and a plurality of predetermined relationships between signal-to-distortion measurement values and reliability metrics corresponding to different base station configurations; and
    sending at least one signal quality transmission to the base station based on the determined target base station configuration, wherein each of the at least one signal quality transmission includes a signal quality indicator that differs from a signal quality corresponding to the determined signal-to-distortion measurement value.

2. The method of claim 1, wherein the at least one signal quality transmission is a plurality of signal quality transmissions, wherein the plurality of signal quality transmissions is sent until the base station selects the target base station configuration.

3. The method of claim 1, wherein the signal-to-distortion measurement value determined for the device is a first signal-to-distortion measurement value, wherein the at least one signal quality transmission includes a second signal-to-distortion measurement value, wherein the second signal-to-distortion measurement value is different from the first signal-to-distortion measurement value.

4. The method of claim 1, further comprising:
    receiving, at the device, at least one signal from the base station in response to the sending of the at least one signal quality transmission.

5. The method of claim 1, wherein each of the at least one signal quality transmission only includes a binary value.

6. The method of claim 1, wherein the target base station configuration is determined based further on a threshold data rate.

7. The method of claim 6, wherein the threshold data rate corresponds to a target reliability metric such that the target reliability metric is at least met for the device when the base station is configured according to the target base station configuration.

8. The method of claim 1, further comprising:
    determining the at least one signal quality transmission based on a predetermined mapping between base station configurations and data rates.

9. The method of claim 8, wherein the at least one signal quality transmission is determined based further on a target spectral efficiency.

10. A non-transitory computer readable medium having stored thereon instructions for causing a processing circuitry to execute a process, the process comprising:
    determining a signal-to-distortion measurement value for signals received by a device from a base station in a wireless communication network;
    determining a target base station configuration based on the determined signal-to-distortion measurement value and a plurality of predetermined relationships between signal-to-distortion measurement values and reliability metrics corresponding to different base station configurations; and
    sending at least one signal quality transmission to the base station based on the determined target base station configuration, wherein each of the at least one signal quality transmission includes a signal quality indicator that differs from a signal quality corresponding to the determined signal-to-distortion measurement value.

11. A system for optimizing connection stability via communications with base stations in wireless communication networks, the system comprising:
    a processing circuitry; and
    a memory, the memory containing instructions that, when executed by the processing circuitry, configure the system to:
    determine a signal-to-distortion measurement value for signals received by a device from a base station in a wireless communication network;
    determine a target base station configuration based on the determined signal-to-distortion measurement value and a plurality of predetermined relationships between signal-to-distortion measurement values and reliability metrics corresponding to different base station configurations; and
    send at least one signal quality transmission to the base station based on the determined target base station configuration, wherein each of the at least one signal quality transmission includes a signal quality indicator that differs from a signal quality corresponding to the determined signal-to-distortion measurement value.

12. The system of claim 11, wherein the at least one signal quality transmission is a plurality of signal quality transmissions, wherein the plurality of signal quality transmissions is sent until the base station selects the target base station configuration.

13. The system of claim 11, wherein the signal-to-distortion measurement value determined for the device is a first signal-to-distortion measurement value, wherein the at least one signal quality transmission includes a second signal-to-distortion measurement value, wherein the second signal-to-distortion measurement value is different from the first signal-to-distortion measurement value.

14. The system of claim 11, wherein the system is further configured to:
    receive at least one signal from the base station in response to the sending of the at least one signal quality transmission.

15. The system of claim 11, wherein each of the at least one signal quality transmission only includes a binary value.

16. The system of claim 11, wherein the target base station configuration is determined based further on a threshold data rate.

17. The system of claim 16, wherein the threshold data rate corresponds to a target reliability metric such that the target reliability metric is at least met for the device when the base station is configured according to the target base station configuration.

18. The system of claim 11, wherein the system is further configured to:
  determine the at least one signal quality transmission based on a predetermined mapping between base station configurations and data rates.

19. The system of claim 18, wherein the at least one signal quality transmission is determined based further on a target spectral efficiency.

\* \* \* \* \*